US010807555B2

(12) United States Patent
Suzuki (10) Patent No.: US 10,807,555 B2
(45) Date of Patent: Oct. 20, 2020

(54) CURTAIN AIRBAG

(71) Applicant: SUBARU CORPORATION, Tokyo (JP)

(72) Inventor: Mototsugu Suzuki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 210 days.

(21) Appl. No.: 15/850,701

(22) Filed: Dec. 21, 2017

(65) Prior Publication Data

US 2018/0281736 A1    Oct. 4, 2018

(30) Foreign Application Priority Data

Mar. 31, 2017  (JP) .................................. 2017-070370

(51) Int. Cl.
*B60R 21/232*  (2011.01)
*B60R 21/233*  (2006.01)
(Continued)

(52) U.S. Cl.
CPC .......... *B60R 21/232* (2013.01); *B60R 21/233* (2013.01); *B60R 21/23138* (2013.01);
(Continued)

(58) Field of Classification Search
CPC ............ B60R 21/232; B60R 21/23138; B60R 21/233; B60R 2021/23107; B60R 2021/0009; B60R 21/231
See application file for complete search history.

(56) References Cited

U.S. PATENT DOCUMENTS 5,586,782 A * 12/1996 Zimmerman, II ..........................
B60R 21/23138
280/730.2
5,803,485 A *  9/1998 Acker ................... B60R 21/207
280/728.2
(Continued)

FOREIGN PATENT DOCUMENTS

JP       2010036805 A    2/2010
JP       2012-162185 A   8/2012
(Continued)

OTHER PUBLICATIONS

Office Action received in Japanese Patent Application No. 2017-070370 dated Oct. 30, 2018 (3 pages in Japanese with English translation).

*Primary Examiner* — Timothy Wilhelm
(74) *Attorney, Agent, or Firm* — Smith, Gambrell & Russell, LLP (57) ABSTRACT

A curtain airbag includes an upper airbag configured to deploy in a position opposite to an upper half of a side part of a vehicle in which a window is formed, and a lower airbag configured to deploy in a position opposite to a lower half of the side part and coupled to the upper airbag in an up-and-down direction. The upper airbag includes a first expansion section configured to extend in the up-and-down direction and expand to increase in volume in a front part more than in a back part of the first expansion section in a width direction of the vehicle, and the lower airbag includes a second expansion section configured to extend in the up-and-down direction and expand to increase in volume in a front part more than in a back part of the second expansion section in the width direction of the vehicle.

20 Claims, 7 Drawing Sheets (51) Int. Cl.
  *B60R 21/231* (2011.01)
  *B60R 21/00* (2006.01)
(52) U.S. Cl.
  CPC .............. *B60R 2021/0009* (2013.01); *B60R 2021/23107* (2013.01)

(56) References Cited

U.S. PATENT DOCUMENTS

| | | | | |
|---|---|---|---|---|
| 6,390,502 | B1* | 5/2002 | Ryan | B60R 21/232 280/730.1 |
| 6,991,257 | B2* | 1/2006 | Zhao | B60R 21/23138 280/730.2 |
| 7,093,851 | B2* | 8/2006 | Lotspih | B60R 21/23138 280/730.2 |
| 7,152,876 | B2* | 12/2006 | Hofmann | B60R 21/23138 280/743.1 |
| 7,264,269 | B2* | 9/2007 | Gu | B60R 21/232 280/729 |
| 7,513,523 | B2* | 4/2009 | Bayley | B60R 21/232 280/730.2 |
| 7,597,346 | B2* | 10/2009 | McHugh | B60R 21/233 280/729 |
| 7,798,520 | B2* | 9/2010 | Feller | B60R 21/23138 280/729 |
| 7,828,322 | B2* | 11/2010 | Breuninger | B60R 21/231 280/730.2 |
| 7,896,387 | B2* | 3/2011 | Ideue | B60R 21/23138 280/729 |
| 7,988,187 | B2* | 8/2011 | Yamamura | B60R 21/232 280/730.2 |
| 8,267,424 | B2* | 9/2012 | Tomitaka | B60R 21/231 280/730.2 |
| 8,469,395 | B2* | 6/2013 | Richez | B60R 21/207 280/730.2 |
| 8,534,702 | B2* | 9/2013 | Suzuki | B60R 21/23138 280/730.2 |
| 8,550,492 | B2* | 10/2013 | Gwon | B60R 21/23138 280/729 |
| 8,727,375 | B2* | 5/2014 | Suzuki | B60R 21/233 280/730.2 |
| 8,740,247 | B1* | 6/2014 | Jovicevic | B60R 21/232 280/730.2 |
| 8,894,094 | B2* | 11/2014 | Wang | B60R 21/232 280/730.2 |
| 9,150,187 | B1* | 10/2015 | Schiftan | B60R 21/233 |
| 9,421,941 | B2* | 8/2016 | Jo | B60R 21/232 |
| 9,701,272 | B2* | 7/2017 | Massa | B60R 21/213 |
| 9,783,151 | B2* | 10/2017 | Fujiwara | B60R 21/233 |
| 9,809,189 | B2* | 11/2017 | Grell | B60R 21/232 |
| 9,994,184 | B2* | 6/2018 | Deng | B60R 21/0136 |
| 10,131,312 | B2* | 11/2018 | Wiik | B60R 21/23138 |
| 10,214,172 | B2* | 2/2019 | Fujiwara | B60R 21/0136 |
| 2006/0097492 | A1* | 5/2006 | Bakhsh | B60R 21/232 280/730.2 |
| 2006/0202450 | A1* | 9/2006 | Madasamy | B60R 21/23138 280/729 |
| 2007/0040361 | A1* | 2/2007 | Bayley | B60R 21/232 280/730.2 |
| 2008/0100045 | A1* | 5/2008 | Fukawatase | B60R 21/23138 280/730.2 |
| 2008/0296876 | A1* | 12/2008 | Ideue | B60R 21/23138 280/730.2 |
| 2009/0184500 | A1* | 7/2009 | Feller | B60R 21/23138 280/730.2 |
| 2011/0001308 | A1* | 1/2011 | Shibayama | B60R 21/23138 280/729 |
| 2011/0012330 | A1* | 1/2011 | Sato | B60R 21/23138 280/730.2 |
| 2011/0309603 | A1* | 12/2011 | Choi | B60R 21/231 280/729 |
| 2012/0200069 | A1* | 8/2012 | Kato | B60R 21/0136 280/730.2 |
| 2012/0235388 | A1* | 9/2012 | Suzuki | B60R 21/233 280/730.2 |
| 2013/0147168 | A1* | 6/2013 | Alenspach | B60R 21/23138 280/730.2 |
| 2013/0270805 | A1* | 10/2013 | Kruse | B60R 21/232 280/730.2 |
| 2015/0014970 | A1* | 1/2015 | Fujiwara | B60R 21/2346 280/730.2 |
| 2015/0137493 | A1* | 5/2015 | Fujiwara | B60R 21/233 280/729 |
| 2015/0158451 | A1* | 6/2015 | Ward | B60R 21/232 280/730.2 |
| 2015/0166003 | A1* | 6/2015 | Fujiwara | B60R 21/207 280/730.2 |
| 2015/0307057 | A1* | 10/2015 | Moon | B60R 21/232 280/728.2 |
| 2015/0353045 | A1* | 12/2015 | Sendelbach | B60R 21/207 280/729 |
| 2015/0367811 | A1* | 12/2015 | Kobayashi | B60R 21/2346 280/730.2 |
| 2016/0107604 | A1* | 4/2016 | Fujiwara | B60R 21/23138 280/729 |
| 2016/0114757 | A1* | 4/2016 | Fujiwara | B60R 21/23138 280/729 |
| 2016/0159313 | A1* | 6/2016 | Fujiwara | B60R 21/233 280/729 |
| 2016/0229369 | A1* | 8/2016 | Thomas | B60R 21/207 |
| 2016/0272144 | A1* | 9/2016 | Futai | B60R 21/233 |
| 2016/0288762 | A1* | 10/2016 | Deng | B60R 21/0136 |
| 2017/0028962 | A1* | 2/2017 | Goto | B60R 21/23138 |
| 2017/0072896 | A1* | 3/2017 | Fukawatase | B60R 21/232 |
| 2017/0232922 | A1* | 8/2017 | Wiik | B60R 21/23138 280/730.2 |
| 2017/0259770 | A1* | 9/2017 | Fujiwara | B60R 21/01 |
| 2017/0282838 | A1* | 10/2017 | Jung | B60R 21/231 |
| 2017/0305110 | A1* | 10/2017 | Schmid | B32B 5/06 |
| 2017/0334390 | A1* | 11/2017 | Song | B60R 21/207 |
| 2018/0056917 | A1* | 3/2018 | Patel | B60R 21/233 |
| 2018/0072256 | A1* | 3/2018 | Hioda | B60R 21/213 |
| 2018/0079382 | A1* | 3/2018 | Yoo | B60R 21/239 |
| 2018/0099635 | A1* | 4/2018 | Hioda | B60R 21/232 |
| 2018/0126944 | A1* | 5/2018 | Choi | B60R 21/214 |
| 2018/0222433 | A1* | 8/2018 | Byun | B60R 21/207 |
| 2018/0265031 | A1* | 9/2018 | Deng | B60R 21/23138 |
| 2018/0290619 | A1* | 10/2018 | Kitagawa | B60R 21/23138 |
| 2018/0297549 | A1* | 10/2018 | Kobayashi | B60R 21/207 |
| 2018/0326938 | A1* | 11/2018 | Rickenbach | B60R 21/233 |
| 2018/0361979 | A1* | 12/2018 | Schneider | B60R 21/203 |
| 2019/0135218 | A1* | 5/2019 | Takahashi | B60R 21/207 |
| 2019/0161051 | A1* | 5/2019 | Gwon | B60R 21/235 |
| 2019/0217807 | A1* | 7/2019 | Kobayashi | B60R 21/207 |

FOREIGN PATENT DOCUMENTS

| | | |
|---|---|---|
| JP | 2015-013558 A | 1/2015 |
| JP | 2015-066997 A | 4/2015 |
| JP | 2015-140087 A | 8/2015 |
| WO | 2014/210475 | 12/2014 |

* cited by examiner

CURTAIN AIRBAG

CROSS-REFERENCE TO RELATED APPLICATIONS

The present application claims priority from Japanese Patent Application No. 2017-070370 filed on Mar. 31, 2017, the entire contents of which are hereby incorporated by reference.

BACKGROUND

1. Technical Field

The present invention relates to a curtain airbag, in particular, to a curtain airbag configured to deploy in a position opposite to a side part of a vehicle.

2. Related Art

A curtain airbag configured to deploy in a position opposite to a side part of a vehicle has been used. For example, this curtain airbag is deployed to cover a window formed in a side part of the vehicle, and therefore to receive a passenger moving laterally in a collision, and to prevent the passenger from being thrown out of the vehicle when the window is broken. Here, when the passenger is rapidly moving laterally in the collision, the passenger is likely to have a large impact on the head. Accordingly, it is required to appropriately protect the head of the passenger by the curtain airbag.

As a technology for appropriately protecting the head of the passenger, a head-protecting airbag apparatus has been proposed, for example, in Japanese Unexamined Patent Application Publication (JP-A) No. 2010-036805. This head-protecting airbag apparatus can properly protect the head of the passenger by preventing the head of the passenger from moving toward the outside in the event of rollover. After completion of the expansion of the airbag in this head-protecting airbag apparatus, a reinforcing portion is formed to extend across two vertical cells disposed side by side along an anteroposterior direction in the vicinity of the lower ends of the vertical cells. Therefore, if a boundary between the two vertical cells is pressed by the passenger's head moving toward the outside, the reinforcing portion supports the boundary, and therefore it is possible to prevent the airbag from bending outward, and consequently to appropriately protect the head of the passenger.

However, it is difficult for the head-protecting airbag apparatus disclosed in JP-A to reliably absorb the impact on the passenger in the collision because the reinforcing portion suppresses the deformation of the airbag. In particular, when the vehicle is hit from the side, the head of the passenger is rapidly moved to turn to the side. In this case, it is difficult to deform the airbag to absorb this impact on the head.

SUMMARY OF THE INVENTION

It is desirable to provide a curtain airbag capable of reliably absorbing an impact on a passenger in a collision while holding the passenger in the vehicle compartment.

An aspect of the present invention provides a curtain airbag including an upper airbag configured to deploy in a position opposite to an upper half of a side part of a vehicle in which a window is formed, and a lower airbag configured to deploy in a position opposite to a lower half of the side part and coupled to the upper airbag in an up-and-down direction. The upper airbag includes a first expansion section configured to extend in the up-and-down direction and expand to increase in volume in a front part more than in a back part of the first expansion section in a width direction of the vehicle, and the lower airbag includes a second expansion section configured to extend in the up-and-down direction and expand to increase in volume in a front part more than in a back part of the second expansion section in the width direction of the vehicle.

DETAILED DESCRIPTION

Hereinafter, examples of the present invention will be described with reference to the accompanying drawings.

Example 1

Figure 1:
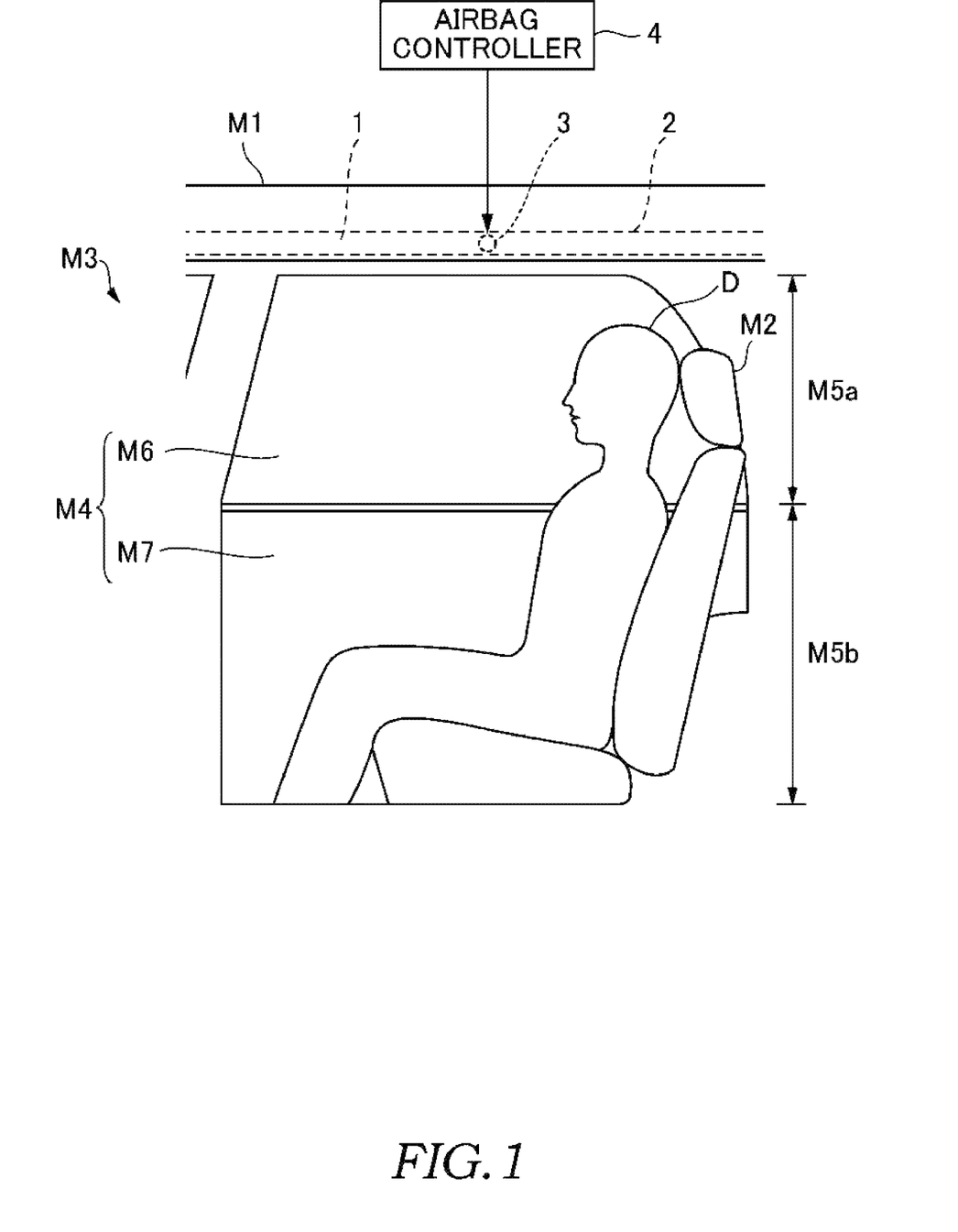
FIG. 1 illustrates the configuration of an airbag apparatus equipped with a curtain airbag according to Example 1 of the present invention.

FIG. 1 illustrates the configuration of an airbag apparatus equipped with a curtain airbag according to Example 1 of the present invention. This airbag apparatus includes a curtain airbag 1, a storage 2 that stores the curtain airbag 1, an inflator 3 disposed in the storage 2, and an airbag controller 4 coupled to the inflator 3. Here, a vehicle equipped with the airbag apparatus includes a vehicle body M1 and a seat M2 disposed inside of the vehicle. A door M4 is disposed in a side part M3 of the vehicle body M1. In addition, a window M6 is formed in an upper half M5a of the door M4, and a trim M7 is formed in a lower half M5b of the door M4.

The curtain airbag 1 is stored in the storage 2, and configured to receive a passenger D sitting on the seat M2 of the vehicle in order to protect the passenger D from the impact in a collision. The storage 2 is disposed in the vicinity of the upper rim of the side part M3 of the vehicle. This storage 2 extends from the front to the back of the side part M3 in the front-to-back direction of the vehicle.

The inflator 3 is configured to inject deployment gas into the curtain airbag 1 to deploy the curtain airbag 1. The airbag controller 4 is configured to drive the inflator 3 to control the deployment of the curtain airbag 1.

Figure 2:
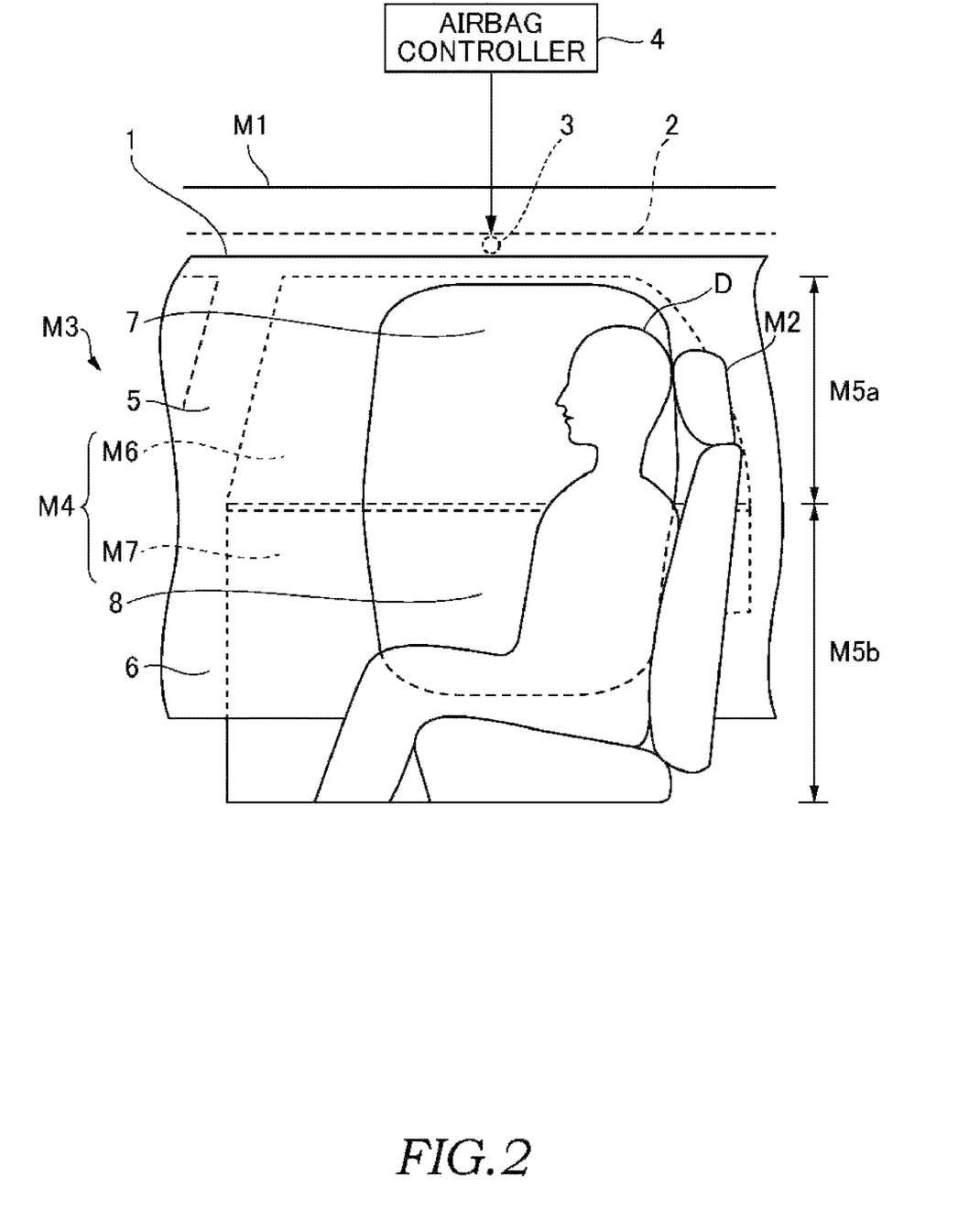
FIG. 2 illustrates deployment of the curtain airbag.

Next, the configuration of the curtain airbag 1 will be described in detail. As illustrated in FIG. 2, the curtain airbag 1 is configured to deploy to cover the side part M3 of the vehicle, and includes an upper airbag 5 and a lower airbag 6. In the side part M3 of the vehicle, the upper airbag 5 is deployed in a position opposite to the upper half M5a in which the window M6 is formed. The upper airbag 5 includes an expansion section 7 disposed on a side of the passenger D sitting on the seat M2. This expansion section 7 extends in the up-and-down direction approximately orthogonal to the floor surface of the vehicle and expands to increase in thickness in the width direction of the vehicle.

The expansion section 7 has an upper end located near the upper rim of the window M6, and a lower end located near the lower rim of the window M6.

The lower airbag 6 is integrally coupled to the upper airbag 5 in the up-and-down direction and deployed in a position opposite to the lower half M5*b* of the side part M3 of the vehicle. The lower airbag 6 includes an expansion section 8 disposed on the side of the passenger D sitting on the seat M2. This expansion section 8 extends in the up-and-down direction approximately orthogonal to the floor surface of the vehicle and expands to increase in thickness in the width direction of the vehicle. The expansion section 8 has an upper end located near the upper rim of the trim M7, and a lower end located near the intermediate part of the trim M7. Moreover the expansion section 8 is disposed in the same position as that of the expansion section 7 of the upper airbag 5 in the front-to-back direction of the vehicle. The upper end of the expansion section 8 is integrally coupled to the lower end of the expansion section 7.

Figure 3:
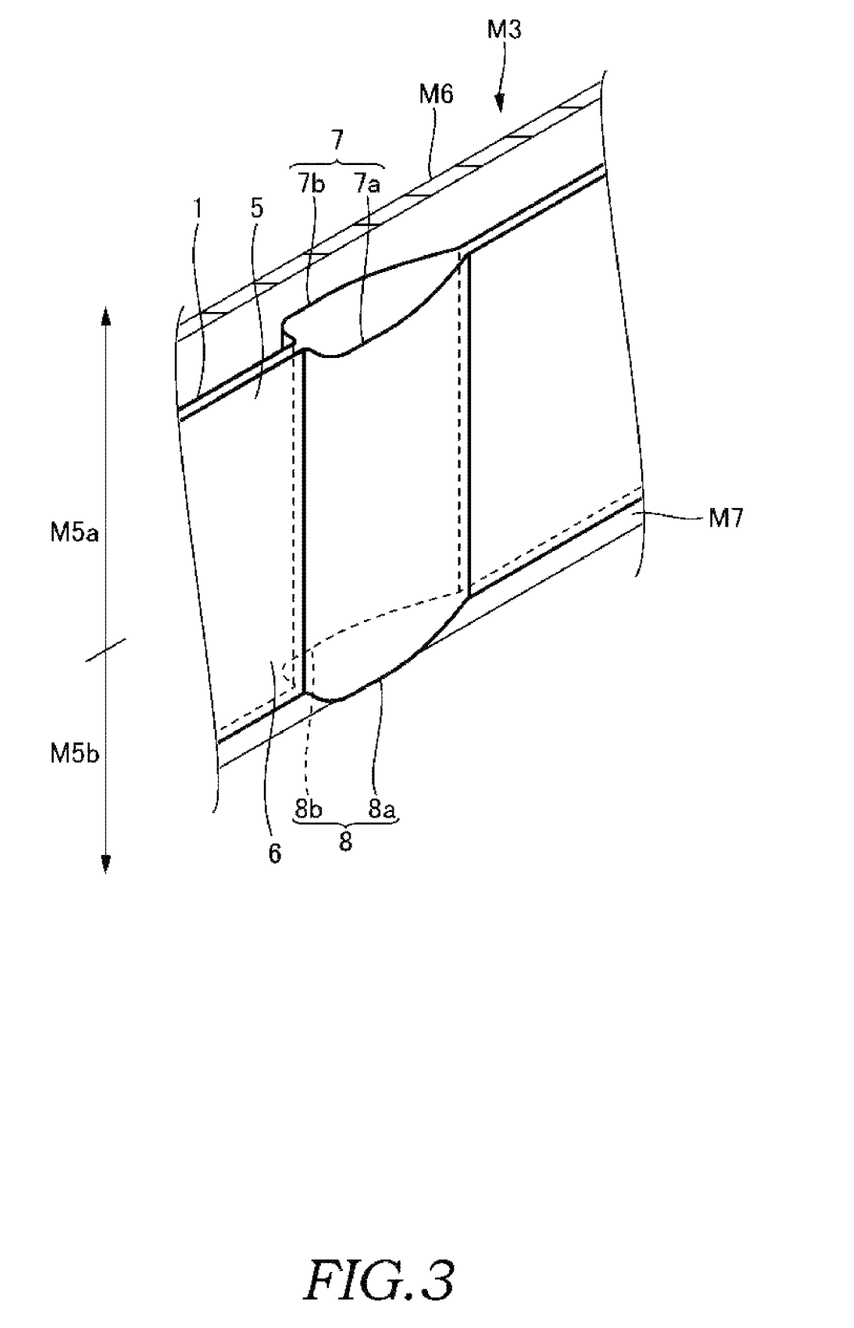
FIG. 3 illustrates the configuration of the curtain airbag.

As illustrated in FIG. 3, the expansion section 7 includes an inner wall 7*a* and an outer wall 7*b* that are formed respectively on the side facing the inside of the vehicle and on the side facing the outside of the vehicle to gradually increase the volume of the expansion section 7 from back to front of the expansion section 7 in the width direction of the vehicle. That is, the expansion section 7 is formed to gradually increase in volume from back to front of the expansion section 7 in the width direction of the vehicle on both the side facing the inside of the vehicle and the side facing the outside of the vehicle.

Meanwhile, the expansion section includes an inner wall 8*a* and an outer wall 8*b* that are formed respectively on the side facing the inside of the vehicle and on the side facing the outside of the vehicle to gradually increase the volume of the expansion section 8 from back to front of the expansion section 8 in the width direction of the vehicle. That is, the expansion section is formed to gradually increase in volume from back to front of the expansion section 8 in the width direction of the vehicle on both the side facing the inside of the vehicle and the side facing the outside of the vehicle.

Next, operations of this example will be described. As illustrated in FIG. 1, first, the vehicle is driven while the curtain airbag 1 is stored in the storage 2. Here, when the vehicle is hit from the side at right angle, the impact in the collision is inputted to a collision detector (not illustrated), and then a collision signal from the collision detector is inputted to the airbag controller 4. Upon receiving the collision signal, the airbag controller 4 drives the inflator 3 to inject the deployment gas into the curtain airbag 1. By this means, the curtain airbag is deployed downward from the storage 2.

As illustrated in FIG. 2, the curtain airbag 1 is deployed to cover the side part M3 of the vehicle. In this case, the curtain airbag 1 is deployed to cover the window M6 from the upper rim to the lower rim of the window M6 by the upper airbag 5, and also to cover the trim M7 from the upper rim to the intermediate part of the trim 7 by the lower airbag 6. By this means, the expansion section 7 provided in the upper airbag 5 extends from a position near the upper rim to a position near the lower rim of the window M6, and the expansion section 8 provided in the lower airbag 6 extends from a position near the upper rim to a position near the intermediate part of the trim M7. In this way, the curtain airbag 1 is deployed, and therefore the head of the passenger D moving just laterally by the impact in the collision can be received by the expansion section 7 of the curtain airbag 1.

Figure 4:
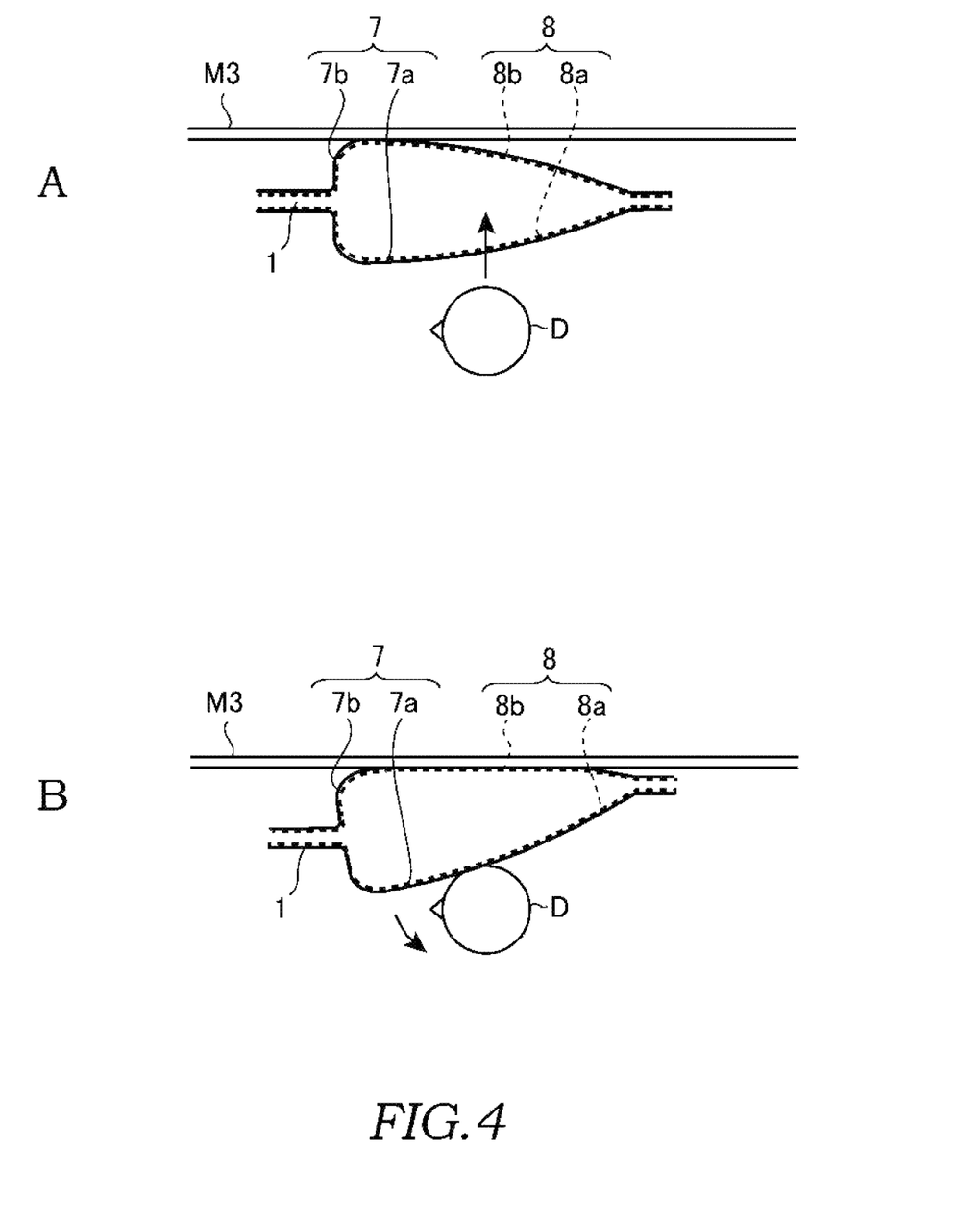
FIG. 4 illustrates a situation where the curtain airbag is deformed.

Here, by the impact in the collision, the head of the passenger D is turned in the direction to face the outside of the vehicle, where the collision occurred. At this time, the head of the passenger D is rapidly moved in the direction to face the outside of the vehicle, and therefore the passenger D has a risk of being seriously injured in the head. To prevent this risk, the inner wall 7*a* of the expansion section 7 is formed to increase the volume of the expansion section 7 in the front part more than in the back part on the side facing the inside of the vehicle, as illustrated in FIG. 4A. By this means, upon receiving the head of the passenger D, the inner wall 7*a* is deformed so as to push back the front of the head by the front part of the inner wall 7*a*, that is, deformed so as to move the front part of the inner wall 7*a* to the inside of the vehicle, as illustrated in FIG. 4B. By this means, it is possible to prevent the head of the passenger D from turning to the outside of the vehicle with a high acceleration, and therefore to reduce a risk of being injured in the head. In addition, the inner wall 7*a* of the expansion section 7 is formed to gradually increase the volume of the expansion section 7 from back to front of the expansion section 7 in the width direction of the vehicle. Then, the inner wall 7*a* is deformed so as to smoothly push back the front of the head to the inside of the vehicle. Therefore, it is possible to prevent the head from turning to the outside of the vehicle with a high acceleration.

Meanwhile, the outer wall 7*b* of the expansion section 7 is formed to increase the volume of the expansion section 7 in the front part more than in the back part on the side facing the outside of the vehicle. By this means, the deformation of the inner wall 7*a* is promoted, and therefore it is possible to further prevent the head from turning to the outside of the vehicle with a high acceleration. In addition, the outer wall 7*b* of the expansion section 7 is formed to gradually increase the volume of the expansion section 7 from back to front of the expansion section 7 in the width direction of the vehicle. By this means, the inner wall 7*a* is smoothly deformed, and therefore it is possible to prevent the head from turning to the outside of the vehicle with a high acceleration.

Meanwhile, as illustrated in FIG. 2, the expansion section 8 of the lower airbag 6 is disposed to extend along the trim M7 in the up-and-down direction of the vehicle. By this means, the expansion section 8 supports the curtain airbag 1 as a brace member, and therefore it is possible to prevent the upper airbag 5 from being out of the vehicle from the window M6 when the passenger D is received by the expansion section 7. Moreover, the expansion section 8 is disposed in the same position as that of the expansion section 7 of the upper airbag 5 in the front-to-back direction of the vehicle. Here, the upper end of the expansion section 8 is coupled to the lower end of the expansion section 7. Accordingly, the expansion section 8 can strongly support the curtain airbag 1, as a brace member extending continuously from the expansion section 7, and therefore can substantially prevent the upper airbag 5 from being out of the vehicle from the window M6.

In addition, as illustrated in FIG. 4A, the outer wall 8*b* of the expansion section 8 is formed to increase the volume of the expansion section 8 in the front part more than in the back part on the side facing the outside of the vehicle. This prevents the deformation of the expansion section 7 from being inhibited, and therefore it is possible to prevent the head received by the expansion part 7 from turning to the side facing the outside of the vehicle with a high acceleration. In addition, the outer wall 8*b* of the expansion section 8 is formed to gradually increase the volume of the expansion section 8 from back to front of the expansion section 8 in the width direction of the vehicle, and therefore it is possible to smoothly deform the expansion section 7.

Meanwhile, the inner wall 8a of the expansion section 8 is formed to increase the volume of the expansion section 8 in the front part more than in the back part on the side facing the inside of the vehicle, and therefore it is possible to prevent the deformation of the expansion section 7 from being inhibited. Moreover, the inner wall 8a of the expansion section 8 is formed to gradually increase the volume of the expansion section 8 from back to front of the expansion section 8 in the width direction of the vehicle, and therefore it is possible to smoothly deform the expansion section 7.

Figure 5:
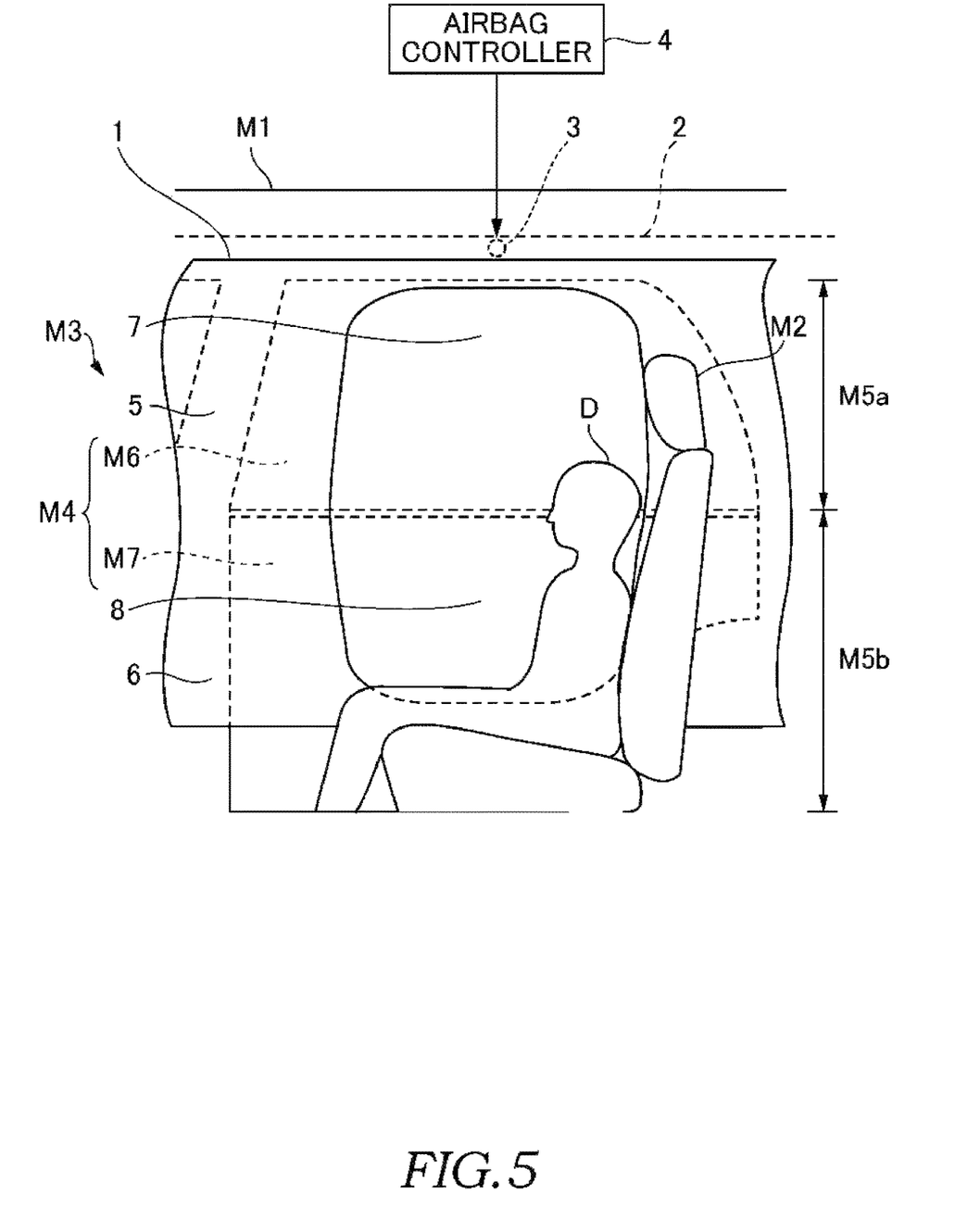
FIG. 5 illustrates a situation where an expansion section of a lower airbag is disposed to protect a small passenger.

The expansion section 7 and the expansion section 8 are formed to extend from a position near the upper rim of the window M6 to a position near the intermediate part of the trim M7. Therefore, it is possible to receive the passenger D regardless of the physical size of the passenger D. For example, as illustrated in FIG. 5, when the passenger D is a child or a small person, it is possible to reliably receive the passenger D by the expansion section 8 located just beside the passenger D.

According to Example 1, the expansion section 7 of the upper airbag 5 is formed to increase in volume in the front part more than in the back part in the width direction of the vehicle, and also the expansion section 8 of the lower airbag 6 is formed to increase in volume in the front part more than in the back part in the width direction of the vehicle. Therefore, it is possible to smoothly deform the expansion section 7 while the upper airbag 5 is supported by the expansion section 8 with the minimum volume, and consequently to reliably absorb the impact on the passenger D in the collision while holding the passenger D in the vehicle compartment.

Example 2

Figure 6:
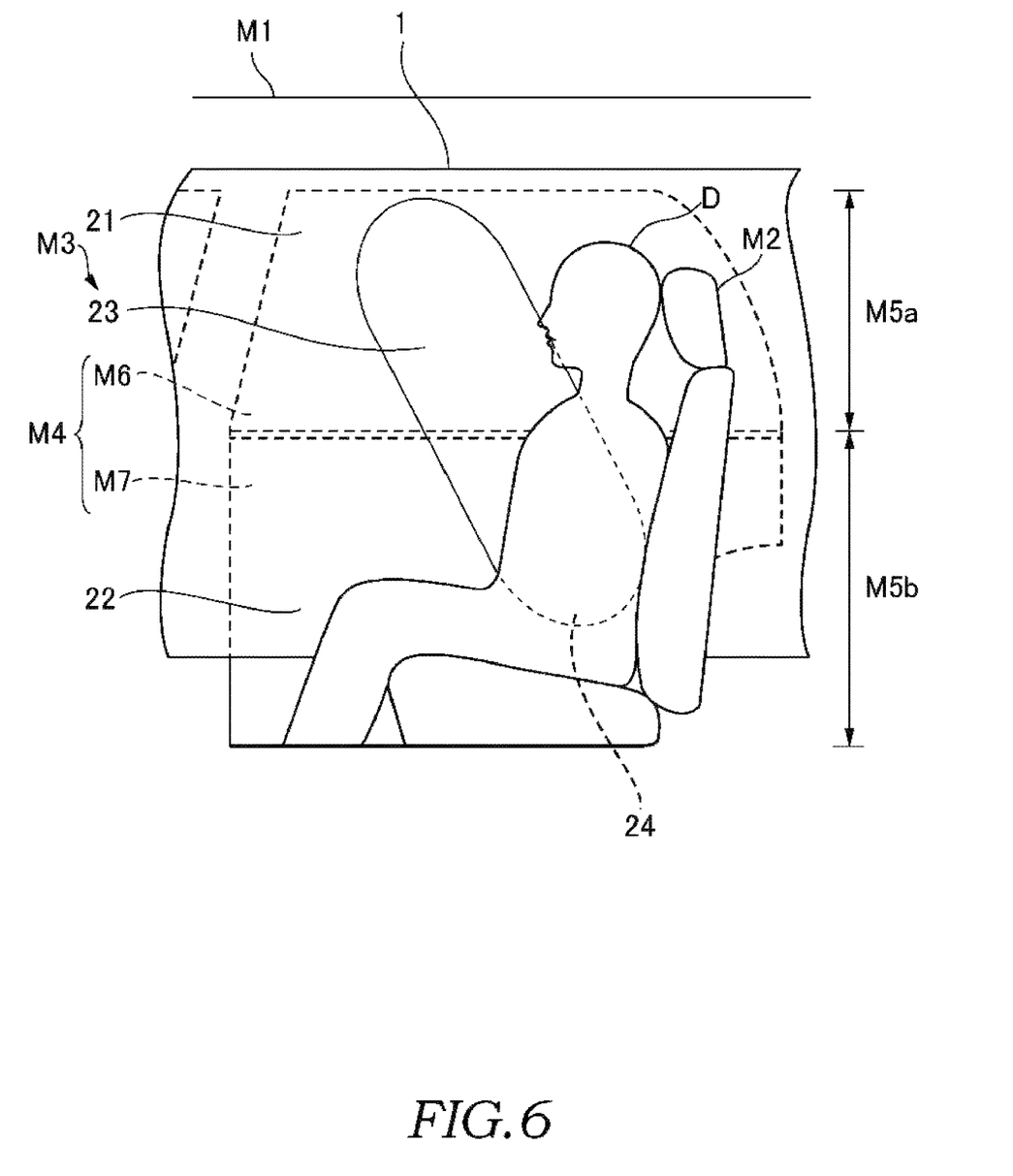
FIG. 6 illustrates the configuration of the curtain airbag according to Example 2.

With the above-described Example 1, the expansion section 7 of the upper airbag 5 and the expansion section 8 of the lower airbag 6 are formed to extend in the up-and-down direction orthogonal to the floor surface of the vehicle. However, this is by no means limiting, as long as the expansion sections 7 and 8 extend in the up-and-down direction. For example, as illustrated in FIG. 6, an upper airbag 21 may be disposed instead of the upper airbag 5 of Example 1, and a lower airbag 22 may be disposed instead of the lower airbag 6 of Example 1.

The upper airbag 21 includes an expansion section 23 which extends obliquely backward from the upper end to the lower end. In the same way as Example 1, the expansion section 23 includes an inner wall formed to gradually increase the volume of the expansion section 23 from back to front of the expansion section 23 in the width direction of the vehicle on the side facing the inside of the vehicle, and an outer wall formed to gradually increase the volume of the expansion section 23 from back to front of the expansion section 23 in the width direction of the vehicle on the side facing the outside of the vehicle.

The lower airbag 22 includes an expansion section 24 which extends obliquely backward from the upper end to the lower end. In the same way as Example 1, the expansion section 24 includes an inner wall formed to gradually increase the volume of the expansion section 24 from back to front of the expansion section 24 in the width direction of the vehicle on the side facing the inside of the vehicle, and an outer wall formed to gradually increase the volume of the expansion section 24 from back to front of the expansion section 24 in the width direction of the vehicle on the side facing the outside of the vehicle.

Here, the lower end of the expansion section 23 and the upper end of the expansion section 24 are integrally coupled to one another. That is, the expansion section 23 of the upper airbag 21 and the expansion section 24 of the lower airbag 22 are formed to extend linearly and obliquely backward from the upper end to the lower end. In this case, the expansion sections 23 and 24 are inclined to cover the range from the passenger D having a large size to the passenger D having a small size, and therefore when the passenger D moves obliquely forward in a collision, it is possible to appropriately receive the passenger D regardless of the physical size of the passenger D.

According to Example 2, the expansion section 23 and the expansion section 24 are formed to extend obliquely backward from the upper end to the lower end, and the lower end of the expansion section 23 and the upper end of the expansion section 24 are coupled to one another. Therefore, when the passenger D moves obliquely forward in the collision, it is possible to reliably receive the head of the passenger D by the expansion sections 23 and 24, regardless of the physical size of the passenger D.

Example 3

Figure 7:
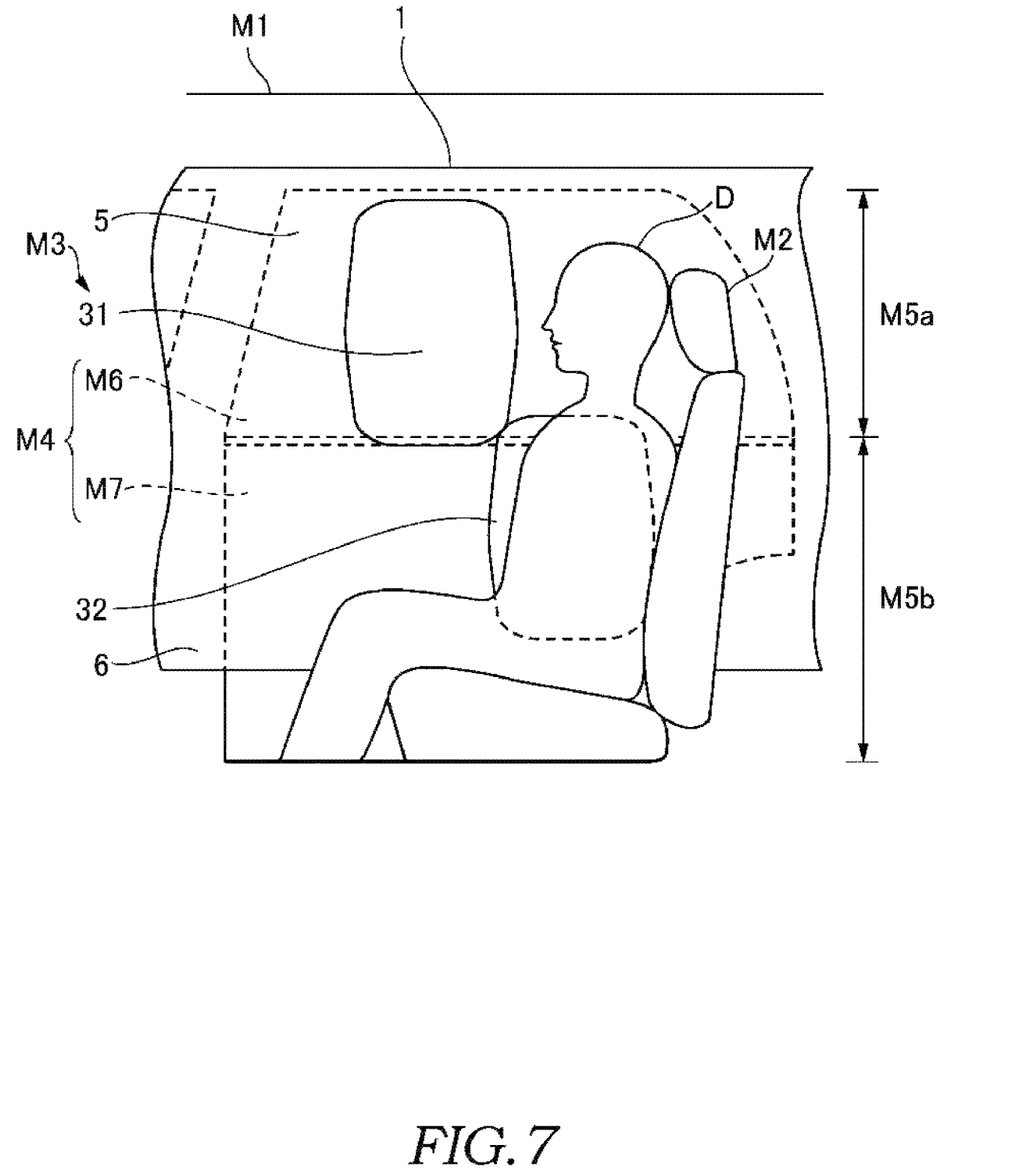
FIG. 7 illustrates the curtain airbag according to Example 3.

With the above-described Example 1, the expansion section of the lower airbag is disposed in the same position as that of the expansion section of the upper airbag in the front-to-back direction of the vehicle. However, this is by no means limiting, and the expansion sections may be disposed in different position in the front-to-back direction. For example, as illustrated in FIG. 7, an expansion section 31 may be disposed instead of the expansion section 7 of Example 1, and an expansion section 32 may be disposed instead of the expansion section 8 of Example 1.

The expansion section 31 is disposed to extend in the up-and-down direction on a side of the passenger D sitting on the seat M2. Here, in the same way as Example 1, the expansion section 31 includes an inner wall formed to gradually increase the volume of the expansion section 31 from back to front of the expansion section 31 in the width direction of the vehicle on the side facing the inside of the vehicle, and an outer wall formed to gradually increase the volume of the expansion section 31 from back to front of the expansion section 31 in the width direction of the vehicle on the side facing the outside of the vehicle. The expansion section 32 is disposed behind the expansion section 31 in a position different from that of the expansion section 31. Here, in the same way as Example 1, the expansion section 32 includes an inner wall formed to gradually increase the volume of the expansion section 32 from back to front of the expansion section 32 in the width direction of the vehicle on the side facing the inside of the vehicle, and an outer wall formed to gradually increase the volume of the expansion section 32 from back to front of the expansion section 32 in the width direction of the vehicle on the side facing the outside of the vehicle.

Here, the expansion section 31 is disposed in front of the passenger D sitting on the seat M2 to address a case where the vehicle is hit from the side at an oblique angle. That is, the expansion section 31 is disposed to cover the position to which the passenger D having a large size moves obliquely forward when the vehicle is hit from the side at an oblique angle. Moreover, the expansion section 32 is disposed to cover the position to which the passenger D having a small size moves obliquely forward when the vehicle is hit from the side at an oblique angle.

According to Example 3, the expansion section 32 is disposed behind the expansion section 31 in a position different from that of the expansion section 31. Therefore, when the passenger D moves obliquely forward in a collision, the expansion sections 31 and 32 can cover the position to which the passenger D moves, regardless of the physical size of the passenger D. Therefore, it is possible to reliably receive the head of the passenger D by the expansion sections 31 and 32.

Here, with the above-described Examples 1 to 3, the expansion section of each of the upper airbag and the lower airbag is formed to increase in volume in both the inner wall side and the outer wall side. However, this is by no means limiting, as long as the expansion sections are formed to increase in volume in the width direction of the vehicle. For example, the expansion section of the upper airbag may be formed to increase in volume only on the inner wall side in the width direction of the vehicle, and meanwhile, the expansion section of the lower airbag is formed to increase in volume only on the outer wall side in the width direction of the vehicle.

Moreover, with the above-described Examples 1 to 3, the expansion section of the upper airbag is formed to gradually increase in volume from back to front of the expansion section in the width direction of the vehicle. However, this is by no means limiting, as long as the volume of the expansion section is increased in the front part more than in the back part in the width direction of the vehicle. Likewise, with the above-described Examples 1 to 3, the expansion section of the lower airbag is formed to gradually increase in volume from back to front of the expansion section in the width direction of the vehicle. However, this is by no means limiting, as long as the volume of the expansion section is increased in the front part more than in the back part in the width direction of the vehicle. For example, the expansion section of the upper airbag and the expansion section of the lower airbag may change in volume step by step.

The invention claimed is:

1. A curtain airbag comprising:
    an upper airbag forming a portion of the curtain airbag and configured to deploy in a position opposite to an upper half of a side part of a vehicle in which a window is formed; and
    a lower airbag forming another portion of the curtain airbag and configured to deploy in a position opposite to a lower half of the side part, the lower airbag being coupled to the upper airbag in an up-and-down direction,
    wherein the upper airbag comprises a first expansion section configured to extend in the up-and-down direction and expand to increase in volume in a front part more than in a back part of the first expansion section in a width direction of the vehicle,
    wherein the first expansion section is further positioned, relative to the front-to-rear direction, as to be between an elongated forward extending section and an elongated rearward extending section of the curtain airbag such that the first expansion section presents a contact surface for a seated passenger's head moving along a line perpendicular to the window of the vehicle,
    wherein the lower airbag comprises a second expansion section configured to extend in the up-and-down direction and expand to increase in volume in a front part more than in a back part of the second expansion section in the width direction of the vehicle,
    wherein the curtain airbag is configured to deploy, in the up-and-down direction, downward from a storage compartment disposed in a vicinity of an upper rim of the side part of the vehicle,
    wherein the forward extending section and the rearward extending section are disposed substantially parallel with respect to a side wall including the window of the vehicle,
    wherein the first expansion section includes a most widthwise expanded front part adjacent to the forward extending section, a most back part adjacent to the rearward extending section, an inner wall facing an inside of the vehicle and extending from the most widthwise expanded front part to the most back part, and an outer wall facing an outside of the vehicle and extending from the most widthwise expanded front part to the most back part,
    wherein the inner wall is, from the most back part through to the most widthwise expanded front part, gradually getting away from the outer wall, and the outer wall is, from the most back part through to the most widthwise expanded front part, gradually getting closer to the side wall of the vehicle, and
    wherein the first expansion section is configured such that the most widthwise expanded front part moves to the inside of the vehicle, when the seated passenger's head contacts the contact surface.

2. The curtain airbag according to claim 1, wherein the first expansion section and the second expansion section are formed to extend in a direction approximately orthogonal to a floor surface of the vehicle.

3. The curtain airbag according to claim 2, wherein:
    the second expansion section is disposed in the same position as that of the first expansion section in a front-to-back direction of the vehicle; and
    an upper end of the second expansion section is coupled to a lower end of the first expansion section.

4. The curtain airbag according to claim 3, wherein the first expansion section is formed to increase in volume in the front part more than in the back part of the first expansion section on a side facing an inside of the vehicle.

5. The curtain airbag according to claim 4, wherein the second expansion section is formed to increase in volume in the front part more than in the back part of the second expansion section on a side facing an outside of the vehicle.

6. The curtain airbag according to claim 3, wherein the second expansion section is formed to increase in volume in the front part more than in the back part of the second expansion section on a side facing an outside of the vehicle.

7. The curtain airbag according to claim 2, wherein the first expansion section is formed to increase in volume in the front part more than in the back part of the first expansion section on a side facing an inside of the vehicle.

8. The curtain airbag according to claim 7, wherein the second expansion section is formed to increase in volume in the front part more than in the back part of the second expansion section on a side facing an outside of the vehicle.

9. The curtain airbag according to claim 2, wherein the second expansion section is formed to increase in volume in the front part more than in the back part of the second expansion section on a side facing an outside of the vehicle.

10. The curtain airbag according to claim 1, wherein the first expansion section is formed to increase in volume in the front part more than in the back part of the first expansion section on a side facing an inside of the vehicle.

11. The curtain airbag according to claim 10, wherein the second expansion section is formed to increase in volume in the front part more than in the back part of the second expansion section on a side facing an outside of the vehicle.

12. The curtain airbag according to claim 1, wherein the second expansion section is formed to increase in volume in the front part more than in the back part of the second expansion section on a side facing an outside of the vehicle.

13. The curtain airbag according to claim 1, wherein the curtain airbag is configured to extend below the window and into an intermediate region part of a door trim of the vehicle.

14. The curtain airbag according to claim 1, wherein the first expansion section extends obliquely in a downward direction as to be more forward in an upper region and more rearward in a lower region.

15. A curtain airbag apparatus, comprising:
the storage compartment and the curtain airbag according to claim 1.

16. The curtain airbag according to claim 1, wherein the curtain airbag is configured to deploy so that:
the rearward extending section deflects so as extend in the front-to-rear direction at a location closer to the window than prior to the passenger head contact, and
the forward extending section, at a location of attachment to the first expansion section, moves inward with the most widthwise expanded front part of the first expansion section upon passenger head contact.

17. The curtain airbag according to claim 1, wherein the first expansion section extends vertically down as to cover a lower rim of the window.

18. The curtain airbag according to claim 17, wherein the upper airbag is configured to extend both forward and rearward of a front seat backrest of the vehicle.

19. The curtain airbag according to claim 1, wherein the upper airbag is configured to extend both forward and rearward of a front seat backrest of the vehicle.

20. The curtain airbag according to claim 1, wherein the first expansion section is configured to be, upon deployment and relative to the front-to-rear direction, entirely positioned between forward and rearward edges of the window in the upper half of the side part of the vehicle such that the forward extending section and rearward extending section extend alongside the window as well.

* * * * *